United States Patent [19]

Casa et al.

[11] Patent Number: 4,781,561
[45] Date of Patent: Nov. 1, 1988

[54] APPARATUS FOR CONTROLLING THE CROSS-LINKING OF ELASTOMERS IN A MOULD

[75] Inventors: Fausto Casa, Bresso; Raniero Mendichi; Angelo C. Bassi, both of Milan, all of Italy

[73] Assignee: Consiglio Nazionale Delle Ricerche, Rome, Italy

[21] Appl. No.: 17,898

[22] Filed: Feb. 24, 1987

[51] Int. Cl.⁴ .............................................. B29C 45/77
[52] U.S. Cl. .................................. 425/135; 264/40.1; 264/40.5; 425/144; 425/150; 425/170; 425/589
[58] Field of Search ............... 425/144, 149, 170, 589, 425/590, 595, 135, 29, 450.1, 140, 143, 150; 264/40.5, 40.3, 328.3, 328.5, 40.1; 73/714

[56] References Cited

U.S. PATENT DOCUMENTS

| | | | |
|---|---|---|---|
| 3,443,280 | 5/1969 | Hugger | 264/40.5 X |
| 3,718,721 | 2/1973 | Gould et al. | 425/144 X |
| 3,850,559 | 11/1974 | Mintz et al. | 425/149 X |
| 3,893,792 | 7/1975 | Laczko | 264/40.5 X |
| 3,969,461 | 7/1976 | Boesch et al. | 264/328.5 X |
| 4,208,176 | 6/1980 | Salerno | 425/149 X |
| 4,235,577 | 11/1980 | Groleau | 264/40.5 X |
| 4,344,142 | 8/1982 | Diehr, II et al. | 425/144 X |
| 4,502,857 | 3/1985 | Hinks | 425/149 X |
| 4,615,849 | 10/1986 | Hahn | 425/149 X |

FOREIGN PATENT DOCUMENTS

| | | | |
|---|---|---|---|
| 77847 | 5/1983 | European Pat. Off. | 425/149 |
| 2539066 | 3/1977 | Fed. Rep. of Germany | 425/149 |
| 61-63428 | 4/1986 | Japan | 425/149 |

Primary Examiner—Richard L. Chiesa
Attorney, Agent, or Firm—Herbert Dubno

[57] ABSTRACT

An apparatus for checking or controlling cross-linking in products made of elastomeric material which is the object of the present invention, comprises a mold of a fixed volume provided with at least one pressure sensor able to detect pressure variations in the mould during cross-linking in order to obtain data referring to the progress of the cross-linking in the case of laboratory applications, while, should the apparatus be used in manufacturing, it can provide an automatic control of the duration of the various stages of the manufacturing cycle by means of microprocessor controlled equipment to which such sensors are connected.

10 Claims, 2 Drawing Sheets

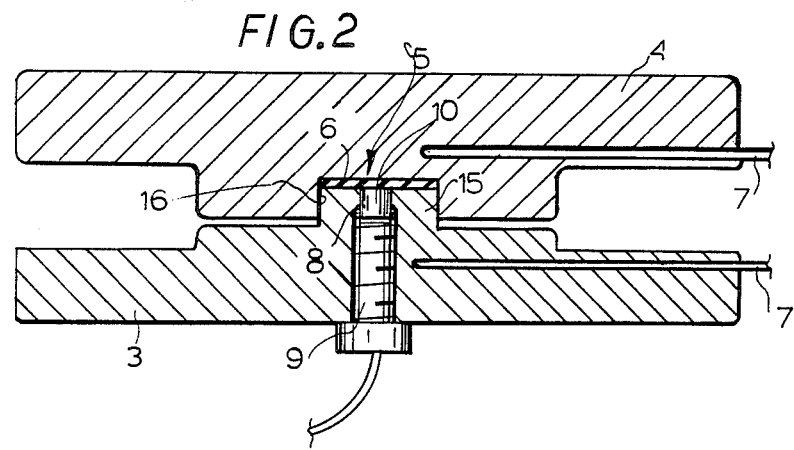
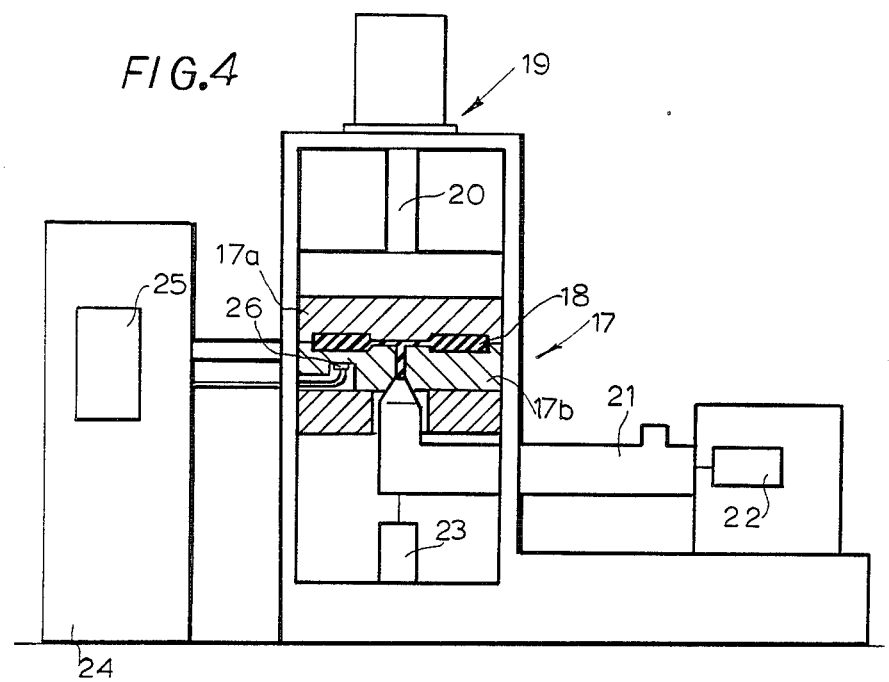

APPARATUS FOR CONTROLLING THE CROSS-LINKING OF ELASTOMERS IN A MOULD

FIELD OF THE INVENTION

The present invention relates to an apparatus for checking or controlling the cross-linking of products made of molded elastomeric material, which enables both the laboratory assessment of the typical parameters of cross-linking and the control of the period during which cross-linking occurs in actual production to be carried out.

BACKGROUND OF THE INVENTION

Products of elastomer material, such as tires and the like, are usually formed within a mold, in which they are kept until the completion of the cross-linking process of the material which is brought from an initial fluid or paste-like state into the solid state characteristic of the finished product by such cross-linking.

The cross-linking, which consists of the formation of transverse links between the chains of the polymer forming the elastomer, takes place in a time dependent upon a number of factors related both to the composition of the mixture and the agents used for the cross-linking and also to external factors, such as pressure and temperature, and it is therefore essential experimentally to establish how the mixture under examination progresses as time goes by in order to be able to supply precise operating data for a successful molding operation.

It is in fact essential for the item obtained to be kept inside the mold until cross-linkage is completed or at least until it has reached a certain stage enabling the item to keep the required shape, without, however, unduly prolonging its stay in the mold, thus avoiding a limitation of productivity and preventing excessive cross-linking which would cause an alteration in the properties of the product.

To this aim and according to a known technique, laboratory tests are carried out on a sample of the mixture out of which the itme has to be made, in order to establish the required length of setting time under specific operating conditions and thereby enabling the molding apparatus to be adjusted accordingly.

For this purpose, vulcanization testers having oscillating rotors are used, among other means, according to agreed standards, the rotor being inserted in a chamber containing the mixture undergoing cross-linking and being kept in oscillating motion within it, and the variation with time of the torque required to maintain constant the oscillation amplitude being measured.

A considerable increase in the measured torque provides an indication that cross-linking is taking place, such cross-linking being completed when the measured torque again becomes constant or varies only slowly, having higher values than those of the initial torque.

The data referring to the variation of the torque throughout the time during which cross-linking is taking place enables the cross-linking time to be established, under specific conditions, in the moulded product to the required degree.

This method, however, is onerous as it requires a vulcanization tester equipped with an oscillating rotor, which is a complex instrument with a delicate structure; moreover the condition under which the mixture being tested adheres to the walls of the chamber and to the rotor is critical, and finally production conditions must be kept constant because, should they vary, the data obtained during the tests would lose their value.

OBJECT OF THE INVENTION

It is, therefore, an object of the invention to provide an apparatus for measuring the progress of cross-linking which is easy to operate and which also makes it possible, throughout production, for the real development in the cross-linking process to be checked under the conditions prevailing at any time, so that the molding operation can be automatically controlled accordingly without keeping to a previously prepared fixed timetable.

SUMMARY OF THE INVENTION

These results are achieved by the present invention, which provides an apparatus for checking or controlling the progress of cross-linking in elastomer products comprising a mold, carried by controllable closing means, consisting of two detachable parts defining an impression corresponding to the shape of one or more items made out of an elastomer, the mold being able to withstand a cross-linking process that takes place inside it and being equipped with at least one pressure sensor rigidly mounted on one of the two parts of the mold. The sensitive surface of the sensor is in contact with the elastomer material undergoing cross-linking and is connected to the means for recording and/or processing changes in pressure within the impression of the mould containing the elastomer to be moulded.

In particular, according to one embodiment, the apparatus for checking or controlling the progress of cross-linking in elastomer products comprises a mold carried by controllable closable means consisting of two detachable parts defining an impression and able to receive a constant quantity of material which matches the shape of an elastomer test item, the mold being equipped with temperature control means and having at least one pressure sensor rigidly mounted on one of the two parts of the mold, the sensitive surface of the sensor being in contact with the elastomer material undergoing cross-linking and being connected to the means for recording changes in pressure inside the impression in the mold containing the elastomer.

One of the parts of the mold has a hollow impression whereas the other has a projecting element which can be inserted into the hollow impression or cavity, so that a seal can be achieved between the respective coupled-together side walls, there being defined within the hollow impression a space able to receive an elastomer test item, the mold being mounted on closing means enabling the two parts to be tightly closed and locked one against the other, the projecting element of one fitting inside the impression in the other and the end of the run position being maintained to the end of the test.

In another embodiment of the apparatus for checking or controlling the progress of cross-linking in elastomer products according to the invention, the locking means carrying the mold comprises a moulding press and the mold has one or more pressure sensors located at significant regions within the mold, which are used to detect pressure changes in the mold during molding and cross-linking, and are connected to a control panel which is provided for an automatic control of the successive stages in the molding operation. More specifically, the apparatus according to the invention can be used in the production of elastomer products by injection molding, in which case the locking means carrying the mold comprises an injection molding press equipped with means for closing and opening the mold, an injection assembly having an injection unit by which the elastomer material is fed into the mold and a device for causing the injection assembly to move towards and away from the mold.

In this case, one or more pressure sensors are provided in the mold within the impression region or regions corresponding to the product, within the feeding or connecting channels between such regions and/or within a separate impression region specifically provided for that purpose, the pressure sensor or sensors being connected, together with other parts used to check the molding, to a control panel comprising a microprocessor unit which, upon detection of certain values, is able to control the duration of the successive injection stages, the maintenance of a certain pressure level in the mold and the cross-linking.

Alternatively, in order to enable different molding technologies to be used, the closing means for the mold may include a compression molding press, a transfer press or a mixed press, the mold being provided with one or more pressure sensors connected to a control microprocessor able to regulate the duration of the cross-linking stage in the mold and when the latter is to be opened.

The method according to this invention provides a control of the cross-linking progress in elastomer products within a mold, comprising the measuring of pressure inside a fixed volume chamber of a mold containing the elastomer material, monitoring of the decrease in pressure throughout cross-linking and the detection of the stage at which the gradient of decrease in pressure approaches zero or is less than a pre-established value.

The method according to the invention can be used for injection molding of elastomer products and the cross-linking thereof within the mold and comprises, in a press for the injection molding of the products, the detection of the pressure existing at one or more areas in the mold as material is injected in a fluid condition, stopping the injection when the injection members have completed their operation and the pressure within the mold is higher than a pre-determined value at any area where it is measured, keeping the injection assembly up to pressure against the mold until, upon the detection of a decrease in the pressure corresponding to a pre-established value, it is moved away; opening the mold upon detection such that the pressure in the mold is further decreased below a second pre-established value or upon a decrease in the gradient of pressure variation within the mold.

BRIEF DESCRIPTION OF THE DRAWING

More details will become apparent from the following description, made with reference to the attached drawings, wherein:

FIG. 2 shows a vulcanization tester intended for laboratory tests, according to the invention;

FIG. 4 is a general diagram of an injection moulding press for an elastomer mixture wherein cross-linking is monitored according to the invention.

DETAILED DESCRIPTION OF THE DRAWINGS

The measurement of the progress of cross-linking in a specific elastomer mixture over a period of time and under constant temperature conditions is made, according to common practice, by means of a vulcanization tester having an oscillating rotor, the vulcanization tester being provided with a chamber filled with a fixed amount of the mixture to be measured and containing an oscillating rotor used to measure the torque required to maintain an oscillation of constant amplitude during cross-linking.

The measurement shows an initial slight decrease of the torque caused by the homogeneous heating of the mass under test over a transitory stage lasting as a rule only a few minutes, followed by a considerable increase of the torque when cross-linking is taking place, the torque regaining a practically constant value or only slightly varying as time progresses as a result of completion of the cross-linking process in the mass tested.

Figure 1:
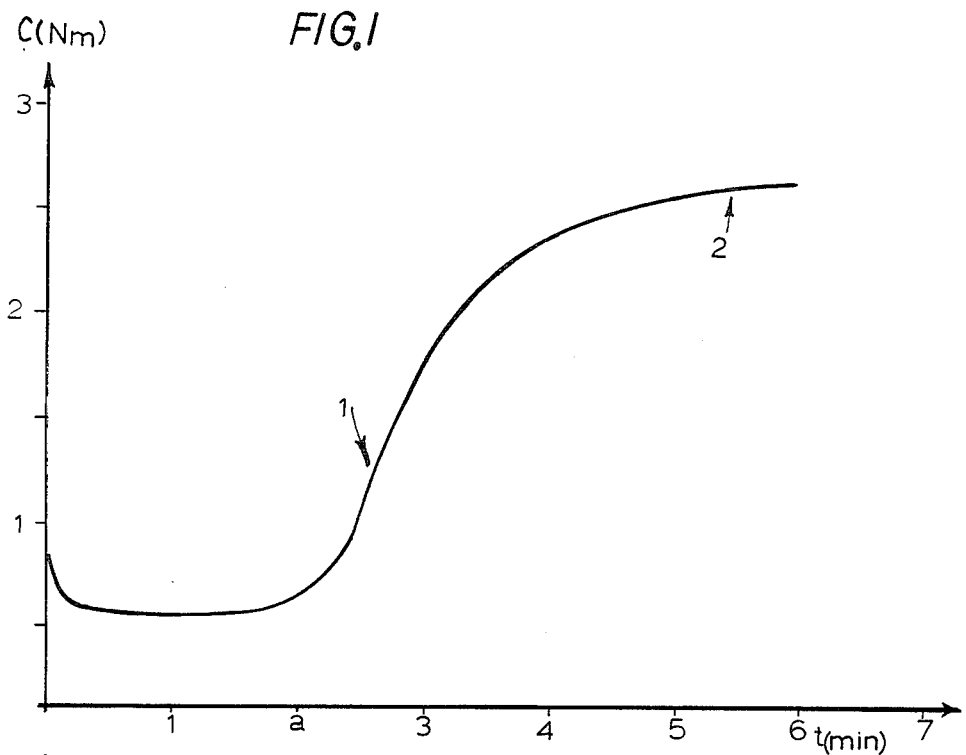
FIG. 1 is a diagram showing how the torque varies as time progresses at constant temperature in a vulcanization tester having an oscillating rotor.

The progress of the test described above is shown, by way of example, in FIG. 1 which illustrates, for a sample of an elastomer mixture, how a torque C (expressed in Nm) varies as a function of a time t (min) and shows an area 1 over which the torque has risen considerably, in correspondence to the stage of cross-linkage of the mixture, followed by an area 2 over which the torque is practically unchanged, once cross-linking is completed.

A study of how cross-linking of the mixture progresses may be carried out in an easier way by using the measuring apparatus according to the invention in the version for laboratory tests as shown in FIG. 2; it substantially comprises a mold made up of two halves, a male part 3 and a female part 4 defining a cavity 5, able to be sealingly locked together, within which cross-linking of the sample 6 of the elastomer mixture to be measured takes place.

The two halves 3 and 4 are provided with temperature control probes 7 and are mounted on a closure member, such as a press for instance, whose initial compression force is kept unchanged throughout the test.

In one of the two halves 3 and 4 of the mold, in fact in the male half 3 in the example given, there is provided a hole 8 within which there is inserted a pressure sensor 9 whose sensitive tip 10, which is in contact with the test piece 6, is connected to a detection and control system comprising a recorder or a microprocessor unit able to produce a curved line showing how pressure varies inside the mold as time progresses and possibly to calculate and to provide directly the characteristic cross-linking parameters indicated by the curve.

The temperature control probes 7 must guarantee to a high degree of precision that the temperature of the sample be accurately maintained (suitably to a level lower than 0.3° C.), so as to avoid expansion or contraction of the test piece caused by temperature variations throughout the test, which may considerably modify the pressure within the mold, resulting in further additions to the pressure variations caused by the cross-linking process.

Figure 3:
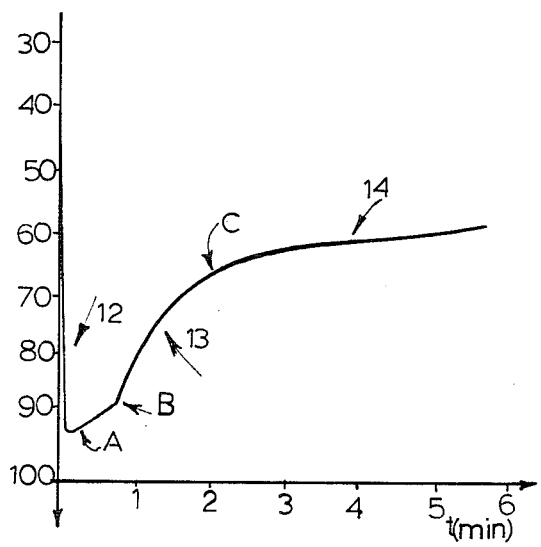
FIG. 3 is a diagram showing how pressure varies as time progresses at a constant temperature when cross-linking is taking place.

A result of a cross-linking test carried out by means of the apparatus of FIG. 2 is shown in FIG. 3 illustrating the way a pressure P(MPa) varies as a function of a cross-linkage time t (min). As can be observed, over an initial region 12, the pressure increases after the press is closed until it reaches the value set for the test, there then follows a stage 13 during which the pressure decreases considerably until, over a region 14, it has a value which does not vary, or varies very little with time.

The pressure decreasing stage 13 corresponds to the cross-linking of the tested mixture and it is possible to notice full agreement between the test carried out by means of the vulcanization tester having an oscillating rotor (FIG. 1) and that carried out by measuring the pressure (FIG. 2); therefore, a measurement of the cross-linkage times taken by using the apparatus according to the invention appears to be fully able to provide operating, technological and theoretical directions, similar to those obtained by means of a vulcanization tester having an oscillating rotor.

The mold used for the cross-linkage tests must be such as to guarantee that for the entire test the chamber is able to hold the same amount of material; to this end the male half of the mold has a plunger 15, aptly cylindrical in shape, suitable to fit with precision inside the cylindrical cavity 16 of the mold half 4, providing a seal between the matching cylindrical walls of the plunger and of the cavity, there being no surfaces in stepped contact, thus preventing possible side leakage of the material not yet vulcanized: the volume of the sample under test and in particular its thickness is therefore defined by the amount of material put inside the mold. A control stops the advance of the press part carrying the movable half of the mold when the pressure reaches the value set for the beginning of the test as measured by the sensor 9: in order not to affect measurement of the pressure pattern within the mold, the type of press used, or the mold closure part, is of a type suitable to keep the position reached by the moving mold half constant throughout the duration of the test, so as not to cause variations in the volume of the test piece. In fact as the possibility of compression of the measured elastomers is very small, a small variation in the volume of the mold chamber would give unreliable pressure readings.

A suitable dimension for the test piece 6 may be for instance ~20 mm diameter with a thickness of ~1 mm.

A consistent thickness of the test piece 6 is dependent upon an accurate measurement of the amount of material introduced in the mold and it is therefore advisable for such measurement to vary in the order of ±10%: however, a variation in the thickness of the sample, proportional to the precision with which the material introduced is measured, has only a limited consequence on the duration of the transitory period over which the temperature of the mass of the sample reaches a consistent value: in fact, given the small size of the sample, whose thickness is suitably about 1 mm, this transitory period is very short and therefore the effects of small variations in the thickness of the sample on the results of the measurement carried out are negligible.

It is also possible to provide a mold having bigger test pieces, and in this case a certain period of transitory temperature conditions is allowed during the test in order to obtain, after cross-linking, parts big enough to withstand further tests such as traction, hardness, resiliency, etc.

The apparatus and method according to the invention find application not only in the laboratory but also for controlling the operating cycle of an industrial press for molding elastomer mixtures using all known molding methods: injection, compression, transfer and a mixture of all these.

By way of example a basic injection molding apparatus for elastomers is shown in FIG. 4.

It substantially comprises a mold 17 including, in a simplified form, two mold halves 17A and 17B, carrying the impressions 18 of the pieces to be molded, a mold closing assembly 19 carrying a movable part consisting, for instance, of a piston 20, or a toggle joint or other system acting on the half mold 17A, an injection part 21 provided with an injection actuator 22 and with an actuator 23 for causing the injector to move towards and away from the mold.

The press is also associated with a control panel 24 carrying the controls for adjusting the length of the cycle, the temperature and the operating pressures, possibly equipped with a microprocessor 25.

One of the recesses 18 of the mold 17, or another impression specifically provided for this purpose, depending on the form of the mold and of the pieces to be obtained, is equipped with a pressure sensor 26 connected to the control panel 24 of the press: the sensor 26 may be connected to an independent microprocessor or, when one is already present, to the same existing microprocessor controlling the press.

Figure 5:
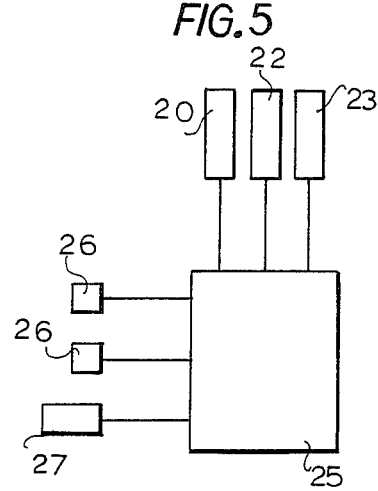
FIG. 5 is a block diagram of the control apparatus for an injection molding press.

The diagram of FIG. 5 shows how, in the case of injection molding, the microprocessor is connected to detection parts which may comprise a quantity sensor 27, for instance an end of the run sensor able to stop the advance of the injection assembly by means of the actuator 23, and several pressure sensors 26 suitably arranged within the impressions of the mold to detect pressure in the most significant areas, the microprocessor being also connected to actuators, comprising an actuator 23 for moving the injection assembly 21 towards and away from the mold, an actuator 20 for closing the mold and an actuator 22 for injecting the unvulcanized material in a fluid condition into the mold.

The injection molding cycle is controlled automatically by the microprocessor receiving signals from the sensor or sensors detecting the pressure and the position of the injection assembly and comprising the successive stages of closing the mold, approaching the injection assembly to the mold, injecting the material into the mold, keeping a certain pressure in the mold, the injection assembly being kept under pressure against the mold to prevent the material which has not yet undergone cross-linking from flowing back through the feeding channels, causing cross-linking of the item formed within the mold once the injection assembly has been moved away from the mold or is no longer kept under pressure against it, and finally opening the mold after the item has undergone cross-linking.

A control ends the injection operation when the sensor or sensors detect that the pressure within the mold has reached a pre-established value and the correct amount of material has been introduced (corresponding to a position A of the diagram in FIG. 3).

The subsequent stage, at which pressure is kept constant, is delayed until the pressure sensors indicate that cross-linking has begun or has progressed to a certain point (corresponding to a position B in FIG. 3).

The cross-linking stage is therefore delayed until the pressure sensors indicate a decrease in pressure by a pre-established amount corresponding to the required degree of cross-linking (position C in FIG. 3).

In this way, rather than working according to a fixed timetable for each stage as is the case in traditional molding, the data collected throughout the experimental stage is used to control the duration of the stages depending on realistic assessments of the conditions of the material within the mold.

It is therefore possible to avoid the drawbacks of conventional molding which causes wastage and low productivity, such as a nil pressure in the mold caused by bad flowing of the material within the mold or by flowing back of such material after the injection assembly has been moved away, pre-cross-linking (scolding) in the injection nozzle and, chiefly, opening of the mold before the material is fully cross-linked or when it is over cross-linked: in fact, the apparatus according to the invention makes it possible, for each molding operation, to detect the exact length of each stage, even when variations in the external molding conditions occur, such as for instance temperature variations and the like.

The presence of one or more pressure sensors in the mold may be particularly advantageous in those cases, for instance when complicated molds are used when there is fear that different areas of the mold may react differently: in such cases the length of the successive stages is controlled by a verification that all the sensors show the expected readings in order to avoid the occurrence of areas of the mold where cross-linking is not completed. In molds of certain shapes, it is also possible to use the signals from some sensors for controlling one stage, for instance the duration of the injection stage, by placing sensors in the most difficult areas to fill; the signals from other sensors may be used to control the length of the stage at which pressure is kept constant, for instance by placing sensors inside the feeding channels, whereas different sensors may provide a more correct indication of the completion of cross-linking by being located in areas where cross-linking occurs later.

In the case of compression molding, transfer molding or mixed molding, for all of which the mold filling stage is comparatively easier than in the previous case, there are provided, within the mold, one or more pressure sensors connected to a controlling microprocessor, such sensors being used to control the progress of cross-linking within the mold with time and to control the opening of the mold when the pressure inside it has dropped to a pre-established value.

In this case too there is the possibility of carrying out an automatic control of the effective progress of cross-linking within the mold and therefore opening the mold only when cross-linking has reached the required stage, under realistic manufacturing conditions.

Many variations may be introduced without departing from the scope of the invention in its basic features.

We claim:

1. An apparatus for making a cross-linked product from a thermally cross-linkable elastomer material within a mold, comprising:
    a mold carried by controllable closing means and made up of two separate parts defining a closed fixed-volume cavity corresponding to the shape of said product and receiving a mass of a thermally cross-linkable elastomer material to be subject to cross-linking treatment within the mold;
    means for heating said material in said mold to cross-link the material in said closed cavity;
    at least one pressure sensor rigidly mounted on one of the parts of the mold and having a sensitive surface in contact with the elastomer material undergoing cross-linking in said closed cavity; and
    means for recording and processing variations of pressure within the closed cavity of the mold containing the elastomer material throughout the molding operation to indicate the progress of cross-linking.

2. The apparatus defined in claim 1, temperature control means connected to said heating means to control the temperature in said cavity.

3. The apparatus defined in claim 2 wherein one of the parts of the mold has a concave recess and the other part has a projection arranged to be inserted into the concave recess in such a way that a seal is provided between matching side walls of said parts and a space suitable for receiving said elastomer material is defined between the parts to form said closed cavity, the closing means locking the parts against one another once the projection of the other part is inserted into the recess in the one part.

4. The apparatus defined in claim 1 wherein the closing means carrying the mold includes a molding press and the mold has a plurality of pressure sensors located in the most significant areas of the mold cavity in order to detect the pressure pattern during molding and the progress of cross-linking within the mold, said sensors being connected to a control panel for the automatic control of successive stages of molding.

5. The apparatus defined in claim 4 wherein the closing means for the mold comprise a compression, a transfer or a mixed molding press, the mold being equipped with at least one pressure sensor connected to a controlling microprocessor able to control the duration of the curing state within the mold and to indicate the time when the mold should be opened.

6. The apparatus defined in claim 4 wherein the closing means carrying the mold includes an injection molding press equipped with means for locking and opening the press, an injection assembly having an injection unit able to feed the elastomer material into the mold and a member for causing the injection assembly to move towards and away from the mold.

7. The apparatus defined in claim 6 wherein a plurality of pressure sensors are provided within the mold cavity in regions corresponding to the product the sensors being connected together with other mold controls to a display panel provided with a microprocessor able to control, according to the detected values, the duration of the successive injection stages, a constant pressure in the mold and the cross-linking.

8. An apparatus for monitoring the cross-linking of a cross-linkable elastomer material, comprising:
    a pair of mold parts together defining a fixed-volume mold cavity adapted to receive said material;
    clamping means for relatively displacing said mold parts between a position in which said cavity is open to allow removal of a molded article and a position in which said cavity is closed to receive said material, said clamping means being constructed and arranged to maintain the volume of said cavity constant in the closed position of said mold parts when said cavity contains said material;
    means for controlling the temperature of said mold parts to maintain the temperature of said material in said cavity in said closed position substantially constant and at a level permitting cross linking of said material;
    at least one pressure sensor mounted in at least one of said mold parts and having a sensitive surface in contact with said material in said cavity in said closed position for sensing the pressure of said material during the cross-linking thereof; and means for recording and processing information as to cross-linking provided by said sensor for monitoring said pressure during said cross-linking.

9. The apparatus defined in claim 8, further comprising injection means connectable to said cavity through at least one of said parts for injecting said material into said cavity.

10. The apparatus defined in claim 8 wherein said means for recording and processing includes control means for operating said clamping means to shift said mold parts into their open position upon the detection of a rate of pressure increase less than a predetermined value.

* * * * *